US012587002B2

(12) United States Patent
Kaneko et al.

(10) Patent No.: US 12,587,002 B2
(45) Date of Patent: Mar. 24, 2026

(54) CONDUIT AND METHOD FOR LAYING CABLE

(71) Applicant: Fujikura Ltd., Tokyo (JP)

(72) Inventors: Soichiro Kaneko, Sakura (JP); Masayuki Ishioka, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 292 days.

(21) Appl. No.: 18/285,952

(22) PCT Filed: Mar. 2, 2022

(86) PCT No.: PCT/JP2022/008769
§ 371 (c)(1),
(2) Date: Oct. 6, 2023

(87) PCT Pub. No.: WO2022/224590
PCT Pub. Date: Oct. 27, 2022

(65) Prior Publication Data
US 2024/0184076 A1    Jun. 6, 2024

(30) Foreign Application Priority Data
Apr. 19, 2021    (JP) ................................. 2021-070668

(51) Int. Cl.
*H02G 7/06*         (2006.01)
*G02B 6/48*         (2006.01)
*H02G 7/08*         (2006.01)

(52) U.S. Cl.
CPC ................. *H02G 7/06* (2013.01); *G02B 6/48* (2013.01); *H02G 7/08* (2013.01)

(58) Field of Classification Search
CPC ... H02G 7/06; H02G 7/08; G02B 6/48; G02B 6/483
See application file for complete search history.

(56) References Cited

U.S. PATENT DOCUMENTS

2023/0178972 A1*  6/2023  Taki ......................... H02G 7/06
                                                                  248/61

FOREIGN PATENT DOCUMENTS

| JP | H07170628 | A | 7/1995 |
|----|-----------|---|--------|
| JP | H08240753 | A | 9/1996 |
| JP | H08240754 | A | 9/1996 |
| JP | H10304535 | A | 11/1998 |
| JP | 2002325320 | A | 11/2002 |
| JP | 2007121737 | A | 5/2007 |
| JP | 2007178563 | A | 7/2007 |
| JP | 2010176148 | A | 8/2010 |

(Continued)

OTHER PUBLICATIONS

International Search Report issued in corresponding International Application No. PCT/JP2022/008769, dated Apr. 26, 2022 (4 pages).

*Primary Examiner* — Michael Stahl
(74) *Attorney, Agent, or Firm* — Osha Bergman Watanabe & Burton LLP

(57) ABSTRACT
A conduit for laying a cable includes a suspension wire, one or more hangers held by the suspension wire and having an accommodation space that accommodates the cable, and a groove extending along an axial direction of the suspension wire. The groove has an opening connected to the accommodation space. The opening has a width smaller than a maximum width of an interior of the groove.

10 Claims, 6 Drawing Sheets

(56)               References Cited

FOREIGN PATENT DOCUMENTS

| KR | 101135639 | B1 | 4/2012 |
| TW | 200526892 | A | 8/2005 |
| TW | 200900773 | A | 1/2009 |
| WO | 2021229879 | A1 | 11/2021 |

* cited by examiner

CONDUIT AND METHOD FOR LAYING CABLE

CROSS-REFERENCE TO RELATED APPLICATIONS

The present application claims priority to Japanese Patent Application No. 2021-070668, filed Apr. 19, 2021. The contents of this application are incorporated herein by reference in their entirety.

BACKGROUND

Technical Field

The present invention relates to a conduit for laying a cable such as an optical fiber cable, and relates to a method for laying the cable.

Description of the Related Art

A bundling suspension wire comprising a suspension wire and hanger members provided at predetermined intervals in suspension wire is known (e.g., see Patent Document 1). A cable through hole is formed in the hanger member, the optical drop cable is disposed in the cable through hole. When this bundling suspension wire is used for laying the optical drop cable, a guide wire is inserted through the cable through hole of each hanger member in the first place, and the optical drop cable is mounted to the guide wire. Then, the optical drop cable is pulled by the guide wire, and the optical drop cable is laid by pulling into the cable through hole.

PATENT DOCUMENT

PATENT DOCUMENT 1: JP 2007-178563 A

However, according to the above bundling suspension wire, because the cable through holes are arranged at a predetermined interval, the insertion work of the guide wire becomes complicated and the workability of the laying work of the optical drop cable is deteriorated.

SUMMARY

One or more embodiments provide a conduit and a method for easily laying the cable.

A conduit according to one or more embodiments is a conduit for laying a cable. The conduit comprises a suspension wire, a hanger that is held by the suspension wire and includes an accommodation space to accommodate the cable, and a groove that extends along an axial direction of the suspension wire. The groove includes an opening connected to the accommodation space. The opening has a width less than a maximum width of an interior of the groove.

In one or more embodiments, the suspension wire may comprise a supporting wire and a coat that coats the supporting wire. The groove may be formed in the coat so that the opening opens into the accommodation space.

In one or more embodiments, the conduit may further comprise the hangers that are spaced along the axial direction of the suspension wire. Each of the hangers may have an annular shape that forms a through hole by being connected to the coat. The cable may be inserted through the through hole.

In one or more embodiments, the hanger may be integrally formed with the coat.

In one or more embodiments, the groove may be formed continuously over an entire axial area of the suspension wire.

In one or more embodiments, the conduit may further comprise the grooves.

In one or more embodiments, a width of the opening may be a width of 80% or less of the maximum width of the interior of the groove.

In one or more embodiments, the groove may be formed in a lower portion of the coat below the supporting wire. The hanger may be connected to the lower portion of the coat below the supporting wire. The opening may be open downward.

A method for laying the cable according to one or more embodiments is a method for laying the cable using the above conduit. The method comprises a first step of connecting the cable to a first end on a thin-wire portion side in a wire-carrying member having a thin-wire portion and a thick-wire portion, a second step of inserting the wire-carrying member into the groove from a second end on a thick-wire portion side in the wire-carrying member, a third step of inserting the cable into the accommodation space by pulling the cable through the wire-carrying member while holding the thick-wire portion in the groove and positioning the thin-wire section in the accommodation space. The thin-wire portion is thinner than a width of the opening. The thick-wire portion is thicker than a width of the opening and thinner than a maximum width of the interior of the groove.

In one or more embodiments, the opening may have a width smaller than a width of the cable.

In one or more embodiments, the thin-wire portion and the thick-wire portion may be composed of mutually independent members.

According to one or more embodiments, it is possible to insert the cable to the accommodation space of the hanger by the wire-carrying member while the wire-carrying member is held in the groove whose the opening has the width less than the maximum width of the interior, the cable can be easily laid.

DESCRIPTION OF THE EMBODIMENTS

First Example

Figure 1:
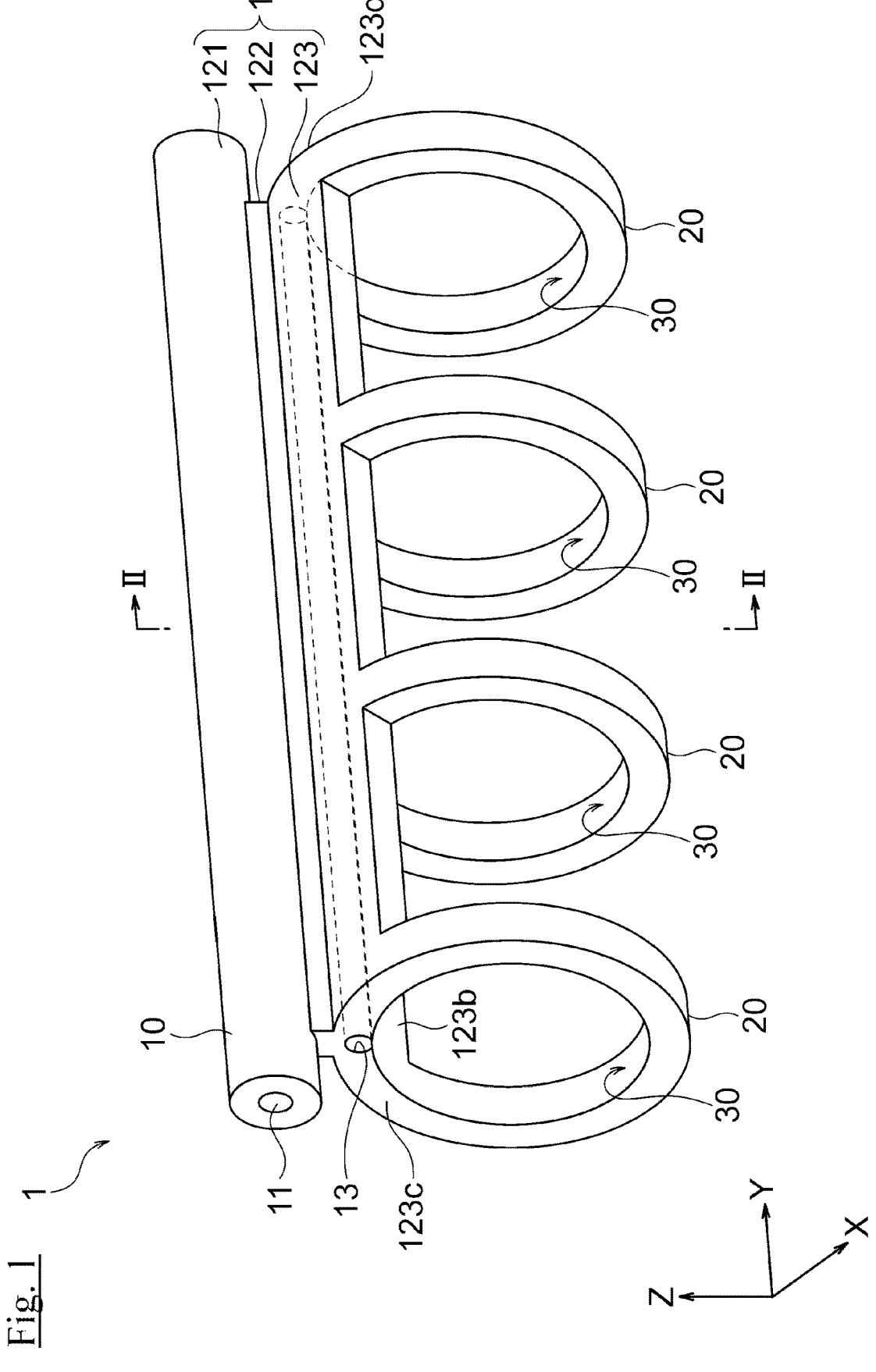
FIG. 1 is a perspective view of an example of a conduit in a first example.
Figure 2:
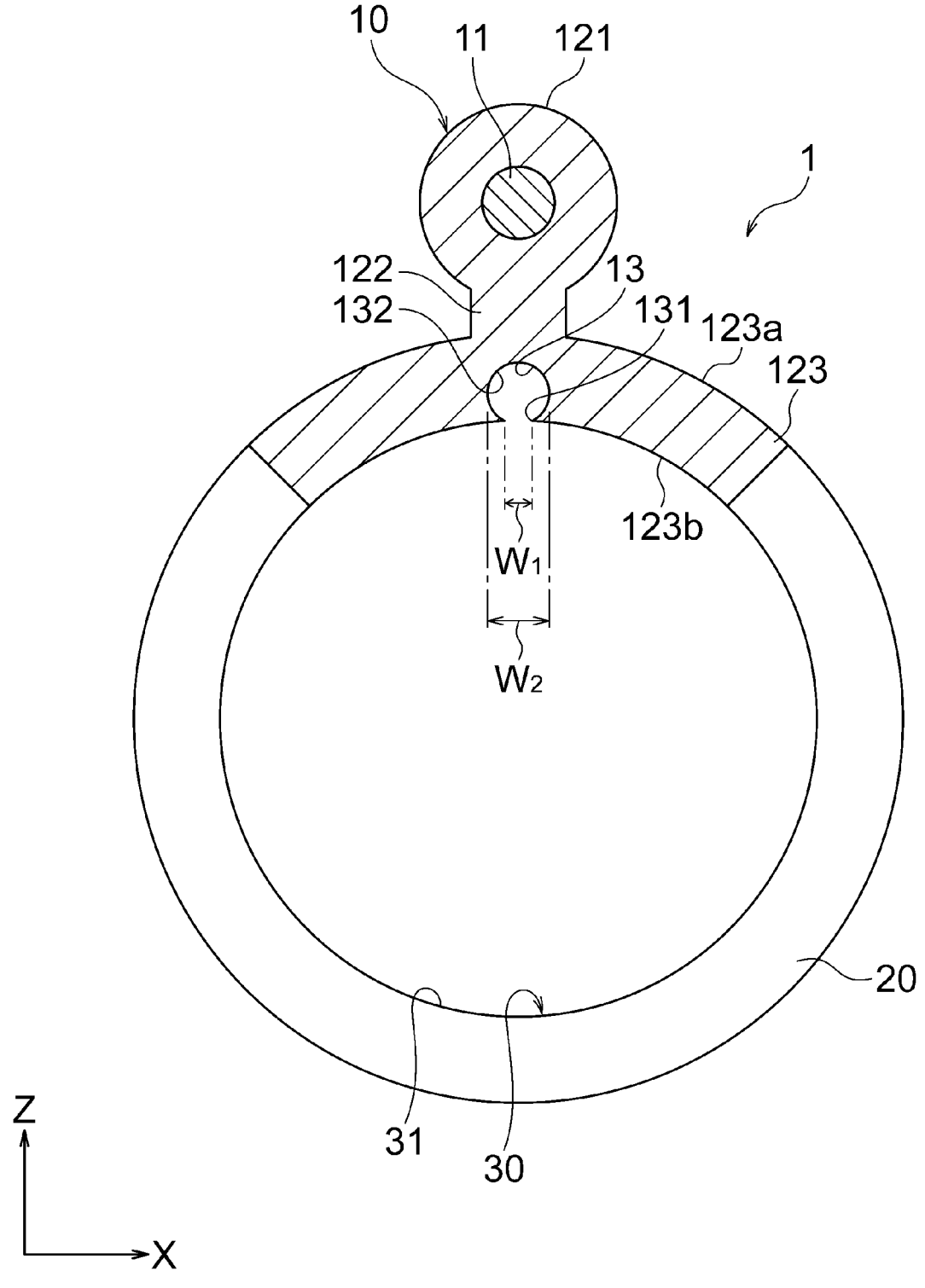
FIG. 2 is a cross-sectional view taken along the line II-II of FIG. 1.

Hereinafter, embodiments will be described with reference to the drawings. FIG. 1 is a perspective view of an example of a conduit according to a first example. FIG. 2 is a cross-sectional view taken along the line II-II of FIG. 1.

The conduit 1 in one or more embodiments is a member used in the overhead of the cable 100 (see FIG. 4) such as an optical fiber cable. The conduit 1 comprises a suspension wire 10 and hangers 20.

The suspension wire 10 is suspended between the utility poles or the like. As shown in FIG. 1, the suspension wire 10 comprises a supporting wire 11 and a coat 12. The supporting wire 11 is a wire having a predetermined strength. As this wire, for example, FRP (Fiber Reinforced Plastics) rods, a wire obtained by twisting the steel wires, or the single steel wire or the like, can be used.

As shown in FIG. 2, the coat 12 comprises a tubular portion 121, a neck portion 122, and a plate-like portion 123. The tubular portion 121, the neck portion 122, and the groove-formed portion 123 is integrally formed. As a material constituting the coat 12, for example, a resinous material such as polyethylene can be used.

The tubular portion 121 has a cylindrical shape which covers the outer periphery of the supporting wire 11. The neck portion 122 that is narrower than the tubular portion 121 is provided at the lower end the of tubular portion 121. This neck portion 122 extends along the axial direction (Y direction in the drawing) of the suspension wire 10 between the tubular portion 121 and the groove-formed portion 123, and connects the tubular portion 121 and the groove-formed portion 123.

The groove-formed portion 123 is provided at the lower end of the neck portion 122. The upper surface 123a of the groove-formed portion 123 is connected to the lower end of the neck portion 122. The groove-formed portion 123 has a curved plate shape so as to protrude toward the supporting wire 11 side, and extends along the axial direction of the suspension wire 10 in the same manner as the neck portion 122. As shown in FIG. 2, this groove-formed portion 123 has a lower surface 123b located on the other side of the suspension wire 10. The shape of groove-formed portion 123 is not particularly limited to the above, for example, it may be a flat plate shape or a column shape that is not curved.

The groove 13 that is recessed toward the suspension wire 10 side is formed in the lower surface 123b. The groove 13 is formed in the lower portion of the coat 12 below the supporting wire 11. This groove 13 is used to insert the wire-carrying rod 201 that pulls the cable 100 (refer to FIG. 4), as described below. The groove 13 of one or more embodiments is disposed at a position so that the central axis of the suspension wire and the central axis of the groove 13 coincide in the vertical direction.

The position of the groove 13 is not limited thereto. The groove 13 is where the wire-carrying rod 201 is inserted. Thus, the groove 13 should be at least above the existing cable to prevent the cable 100 being pulled by the wire-carrying rod 201 from getting under the existing cable when the additional cable 100 is laid. Specifically, the groove 13 may be formed at a position shifted from the central axis of the suspension wire 10. Alternatively, when the groove-formed portion 123 constitutes the upper half of the annulus consisting of the groove-formed portion 123 and the hanger 20, the groove 13 may be formed at any position on the inner peripheral surface of the groove-formed portion 123.

As shown in FIG. 1, the groove 13 in this example extends from the first end 123c of the groove-formed portion 123 to the second end 123d in the lower surface 123b of groove-formed portion 123, the groove 13 is continuously formed over the entire axial area of the suspension wire 10.

As shown in FIG. 2, the groove 13 opens toward the downward direction (−Z direction), and has a substantially circular outer shape in cross-section. For this reason, the width $W_1$ of the opening 131 of the groove 13 is smaller than the maximum width $W_2$ of the interior 132 of the groove 13 ($W_1 < W_2$). The opening 131 is continuously formed over the entire axial area of the suspension wire 10. In one or more embodiments, the groove 13 has a circular cross-sectional shape, but is not particularly limited thereto. The cross-sectional shape of the groove 13 may be any shape capable of inserting the wire-carrying rod 201, for example, the groove 13 may have a cross-sectional shape such as a polygon or elliptical including a rectangular.

When the conduit 1 is used for laying the cable, as described later, the wire-carrying member 200 comprising the wire-carrying rod 201 and the wire-carrying cord 202 thinner than the wire-carrying rod 201 is used for inserting the cable 100 to the interior of the conduit 1. The width $W_1$ of the opening 131 of one or more embodiments is smaller than the diameter $D_1$ of the wire-carrying rod 201 ($W_1 < D_1$), is greater than the diameter $D_2$ of the wire-carrying cord 202 ($W_1 > D_2$). On the other hand, the maximum width $W_2$ of the interior 132 is greater than or equal to the diameter $D_1$ of the wire-carrying rod 201 ($W_2 \geq D_1$) and greater than or equal to the diameter $D_2$ of the wire-carrying cord 202 ($W_2 > D_2$). That is, the groove 13 can hold the wire-carrying rod 201, but the wire-carrying cord 202 is shaped so as to fall out of the groove 13.

The width $W_1$ of the opening 131 may be 80% or less of the maximum width $W_2$ of the interior 132 ($W_1 \leq 0.8 * W_2$) and 50% to 60% of the maximum width $W_2$ of the interior 132 ($0.5 * W_2 \leq W_1 \leq 0.6 * W_2$).

At both ends in the width direction (X direction in the Figures) of the groove-formed portion 123, the hangers 20 are disposed. The hangers 20 are connected to the lower portion of the coat 12 below the supporting wire 11. The hangers 20 are arranged at predetermined intervals along the axial direction of the suspension wire 10. The hanger 20 is made of the same material as the groove-formed portion 123, and is integrally formed with the groove-formed portion 123.

The hanger 20 has a partially missing annular-shaped, a through-hole 30 is formed by connecting the coat 12 in the missing portion. The cable 100 such as the optical fiber cable is inserted into the through-hole 30 of the hanger 20, is supported on the inner peripheral surface 31 of the through-hole 30. Further, the groove 13 communicates with the through-holes 30 by being open to the through-holes 30. The through-holes 30 in one or more embodiments corresponds to an example of "accommodation space" in one or more embodiments.

The hanger 20 of one or more embodiments has a circular ring shape. However, the shape is not particularly limited thereto. For example, the hanger 20 may have a polygonal ring shape including a rectangular or may have an elliptical ring shape. Further, in one or more embodiments, the shape of the through-hole 30 is a circular shape following the shapes of the coat 12 and the hanger 20 but is not limited thereto. The shape of the through-hole 30 may be a polygonal shape or elliptical shape including a rectangular.

Here, an example of the method for producing the conduit 1 will be described. The conduit 1 of one or more embodiments can be produced by extrusion molding. In this extrusion molding, an extrusion molding machine can be used. This extrusion molding machine comprises at least a die portion in which a hole having the same cross-sectional shape as the resin member to be manufactured is formed, a supply unit for supplying a resin to the die portion, a shutter provided on the resin discharge side of the die portion. In one or more embodiments, a die including a first hole having the same cross-sectional shape as the coat 12 and a second hole connected to the first hole and having the same cross-sectional shape as the hanger 20 is used as the die portion. Further, as the shutter, a shutter having a function of opening and closing the second hole for discharging the resin serving as the hanger 20 is used.

In this extrusion molding machine, first, the supporting wire 11 is fed to the die portion. Then, by discharging the supporting wire 11 and the resin from the first and second holes at the same time while supplying the resin from the supply unit to the die portion, the tubular portion 121 coated around the supporting wire 11, the neck portion 122, and the groove-formed portion 123, and the hangers 20 are extruded. During this extrusion molding, the second hole is closed by the shutter at predetermined cycles to dam up the resin in the second hole, thereby the conduit 1 with the hangers 20 intermittently arranged can be formed.

Figure 3:
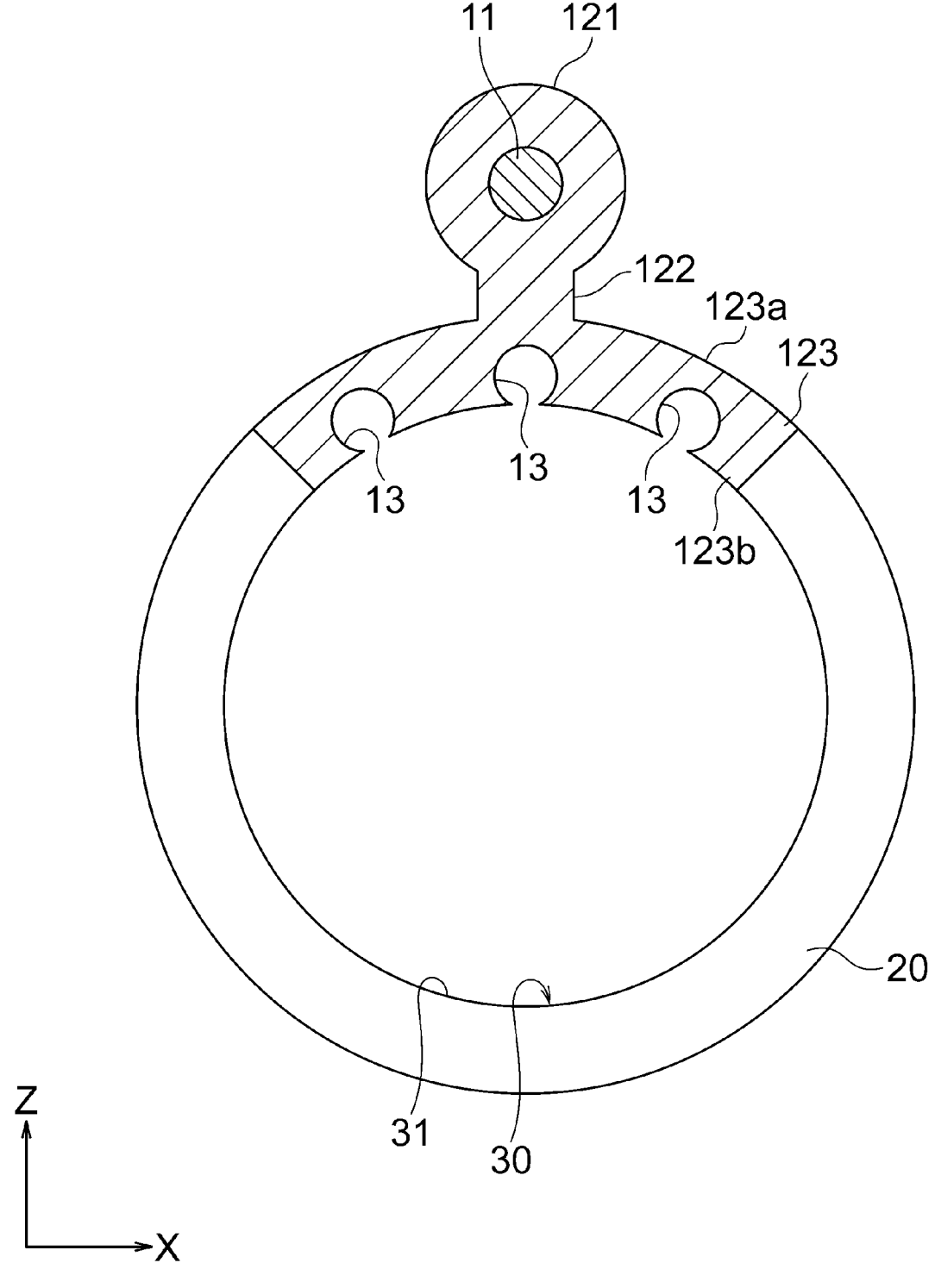
FIG. 3 is a cross-sectional view of a variation of the conduit in the first example.

In one or more embodiments, although only one groove 13 is formed in the groove-formed portion 123, but is not limited thereto, a plurality of the grooves 13 may be formed. FIG. 3 is a cross-sectional view of the variation of the conduit according to the first example. In this variation, the grooves 13 (three in this example) is formed on the lower surface 123*b* of the groove-formed portion 123. The grooves 13 are arranged along the width direction of the groove-formed portion. As this variation, the grooves 13 are formed in the groove-formed portion 123, thereby it is possible to lay a plurality of the cables at the same time by using a plurality of the wire-carrying rods.

Figure 4:
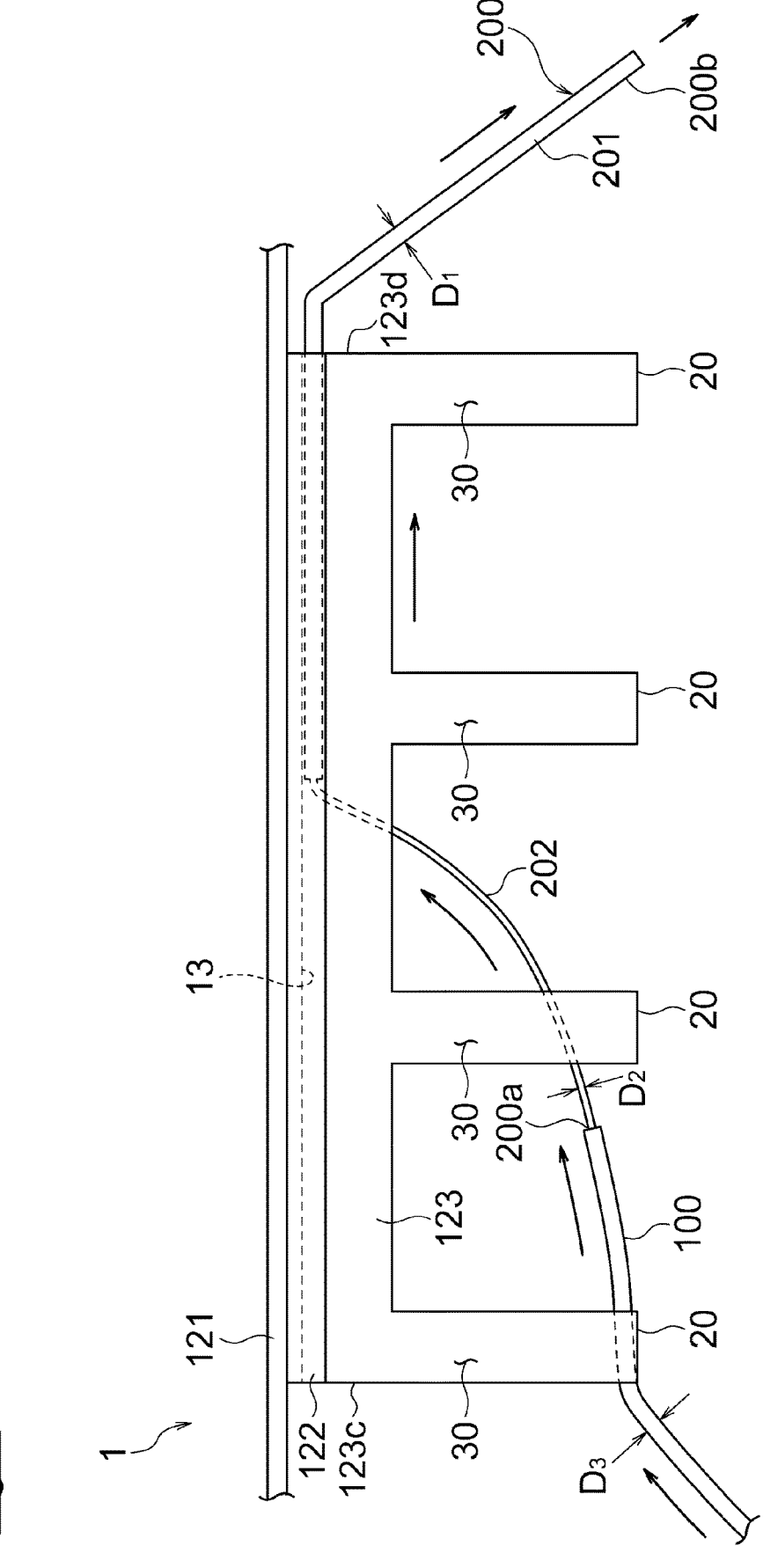
FIG. 4 is a side view of a method for laying the cable by using the conduit in the first example.

Next, the method for laying the cable by using the conduit in the first example is described. FIG. 4 is a side view of the method for laying the cable by using the conduit in the first example. In the method for laying the cable in this example, the cable 100 is laid by towing the cable 100 into the conduit 1 by the wire-carrying member 200 as follows.

First, the wire-carrying member 200 as shown in FIG. 4 is prepared. As the wire-carrying member 200 of one or more embodiments, a member obtained by connecting the wire-carrying rod 201 and the wire-carrying cord 202 to each other. The wire-carrying rod 201 is a rod-shaped member made of a resinous material such as FRP or PET (polyethylene terephthalate and has a circular cross-sectional shape. On the other hand, the wire-carrying cord 202 is a string-like member made of a resinous material such as polypropylene or polyester, and has a circular cross-sectional shape and a lower flexural rigidity than the wire-carrying rod 201 In one or more embodiments, the wire-carrying cord 202 is connected to the wire-carrying rod 201 by binding the wire-carrying cord 202 to the wire-carrying rod 201. The connecting method of the wire-carrying cord 202 and the wire-carrying rod 201 is not limited thereto. For example, the wire-carrying cord 202 may be connected to the wire-carrying rod 201 by fastening with an adhesive tape or a fixture.

The diameter $D_1$ of the wire-carrying cord 202 is smaller than the diameter $D_1$ of the wire-carrying rod 201. The wire-carrying rod 201 in one or more embodiments corresponds to an example of "a thick-wire portion" in one or more embodiments. The wire-carrying cord 202 in one or more embodiments corresponds to an example of "a thin-wire" in one or more embodiments.

Next, the cable 100 is connect to the third end 200*a* of the wire-carrying cord 202 of the wire-carrying member 200 (the first step). In one or more embodiments, the cable 100 is connected to the wire-carrying cord 202 by binding the wire-carrying cord 202 to the cable 100. The connecting method of the cable 100 and the wire-carrying cord 202 is not limited thereto. For example, the cable 100 may be connected to the wire-carrying cord 202 by fastening with an adhesive tape or a fixture.

Next, the fourth end 200*b* on the wire-carrying rod 201 side of the wire-carrying member 200 is inserted, the wire-carrying member 200 is inserted into the groove 13 (second step). In one or more embodiments, the fourth end 200*b* of the wire-carrying member 200 is inserted from the first end 123*c* of conduit 1 to groove 13. As noted above, since the diameter $D_1$ of the wire-carrying rod 201 is greater than the width $W_1$ (refer to FIG. 2) of the opening 131 of the groove 13 ($W_1 < D_1$), the wire-carrying rod 201 is held by the groove 13 without dropping out of the groove 13.

Next, the wire-carrying cord 202 connected to the wire-carrying rod 201 is drawn into the through-holes 30 by further pushing the wire-carrying rod 201 inserted into the groove 13 toward the second end 123*d* side of conduit 1. As described above, the diameter $D_2$ of the wire-carrying cord 202 is smaller than the width $W_1$ (refer to FIG. 2) of the opening 131 of the groove 13 ($D_2 < W_1$). Furthermore, the opening 131 of the groove 13 is connected to the through-holes 30. Therefore, the wire-carrying cord 202 is pulled into the groove 13 once by the wire-carrying rod 201, and then the wire-carrying cord 202 falls out of the opening 131 of the groove 13 by its own weight and is accommodated in the through-holes 30. Incidentally, if the wire-carrying cord 202 does not fall out of the groove 13 of the opening 131 by its own weight, for example, the operator may manually pass the wire-carrying cord 202 through the opening 131 and may place it in the through-holes 30.

Next, as shown in FIG. 4, while the fourth end 200*b* of the wire-carrying rod 201 side of the wire-carrying member 200 is held in the groove 13 and the wire-carrying cord 202 is placed in the through-holes 30, the wire-carrying rod 201 is towed toward the second end 123*d* side of the conduit 1. At this time, since the cable 100 is towed by the wire-carrying cord 202 placed in the through-holes 30, is drawn into the through-holes 30 in accordance with wire-carrying cord 202. In this example, the width $W_1$ (refer to FIG. 2) of the opening 131 of the groove 13 is less than the diameter $D_3$ of the cable 100 ($W_1 < D_3$). Thus, the cable 100 can be prevented from entering the groove 13.

Then, the wire-carrying rod 201 is continuously towed toward the second end 123*d* of the conduit 1, the cable 100 is inserted into all of the through-holes 30 (third step). As described above, the cable 100 can be laid.

According to the conduit 1 and the method for laying the cable in the above embodiments, the wire-carrying cord 202 falls out of the openings 131 of the groove 13 and is accommodated in the through-holes 30 only by inserting the wire-carrying rod 201 into the groove 13. Therefore, the wire-carrying rod 201 and the wire-carrying cord 202 are not caught by the hangers 20 that are intermittently disposed, the wire-carrying cord 201 can easily inserted into all of the through-holes 30. Therefore, the cable 100 can be inserted into all of the through-holes 30 by towing the cable 100 connected to the wire-carrying cord 202 with the wire-carrying cord 202. Thus, since the wire-carrying member 200 can be easily inserted into the through-holes 30, the cable 100 can be easily laid.

In addition, after the first cable laying work, an additional laying work to lay additional cables may be performed. In the conventional conduit, the clearances of the through-holes are narrowed by the existing cable, this may prevent the wire-carrying member from being inserted in the additional laying work. In contrast, in one or more embodiments, when the wire-carrying rod 201 is inserted into the groove 13 provided on the top of the through-holes 30, since the existing cable is present in the through-hole 30 of the hangers 20 but is not present in groove 13, the insertion of the wire-carrying rod 201 by the existing cable is not inhibited.

Also, a work to take some cables from the multiple cables laid and branch the some cables in different directions may performed. When performing this work, according to the conduit 1 in the above embodiments, it is possible to easily take out the cables from between the hangers 20. In addition, if conduit 1 is suspended in advance at the branch and the conduit 1 is used to suspend the cables to be branched, the branch work can be easily performed.

Further, in one or more embodiments, since the groove 13 is formed over the entire axial direction of the suspension wire 10, the wire-carrying rod 202 can easily inserted from the first end portion 123*d* to the second end portion 123*c* of conduit 1, the workability of the laying work of the cable 100 can be improved.

Second Example

Figure 5:
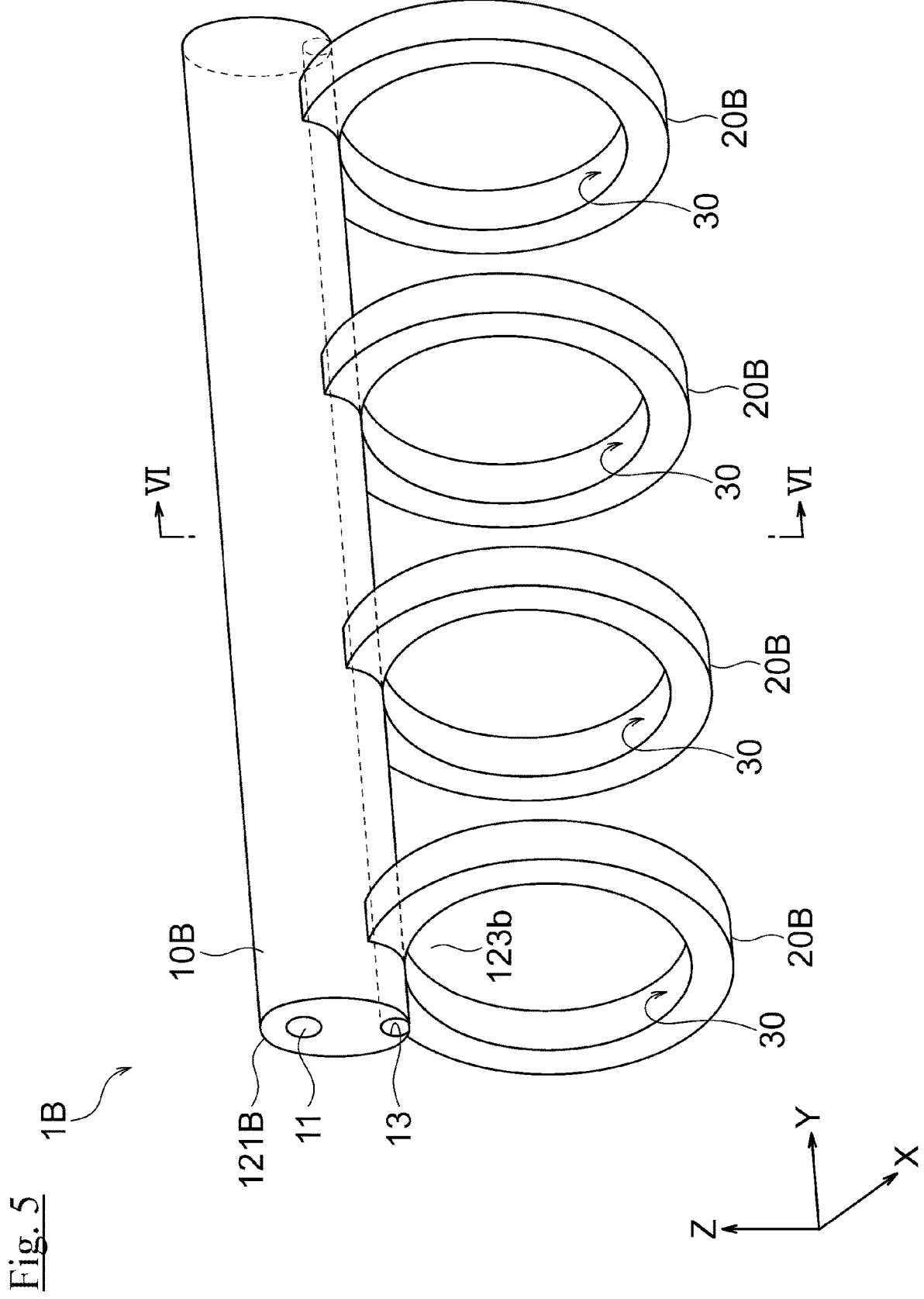
FIG. 5 is a perspective view of an example of a conduit in a second example.
Figure 6:
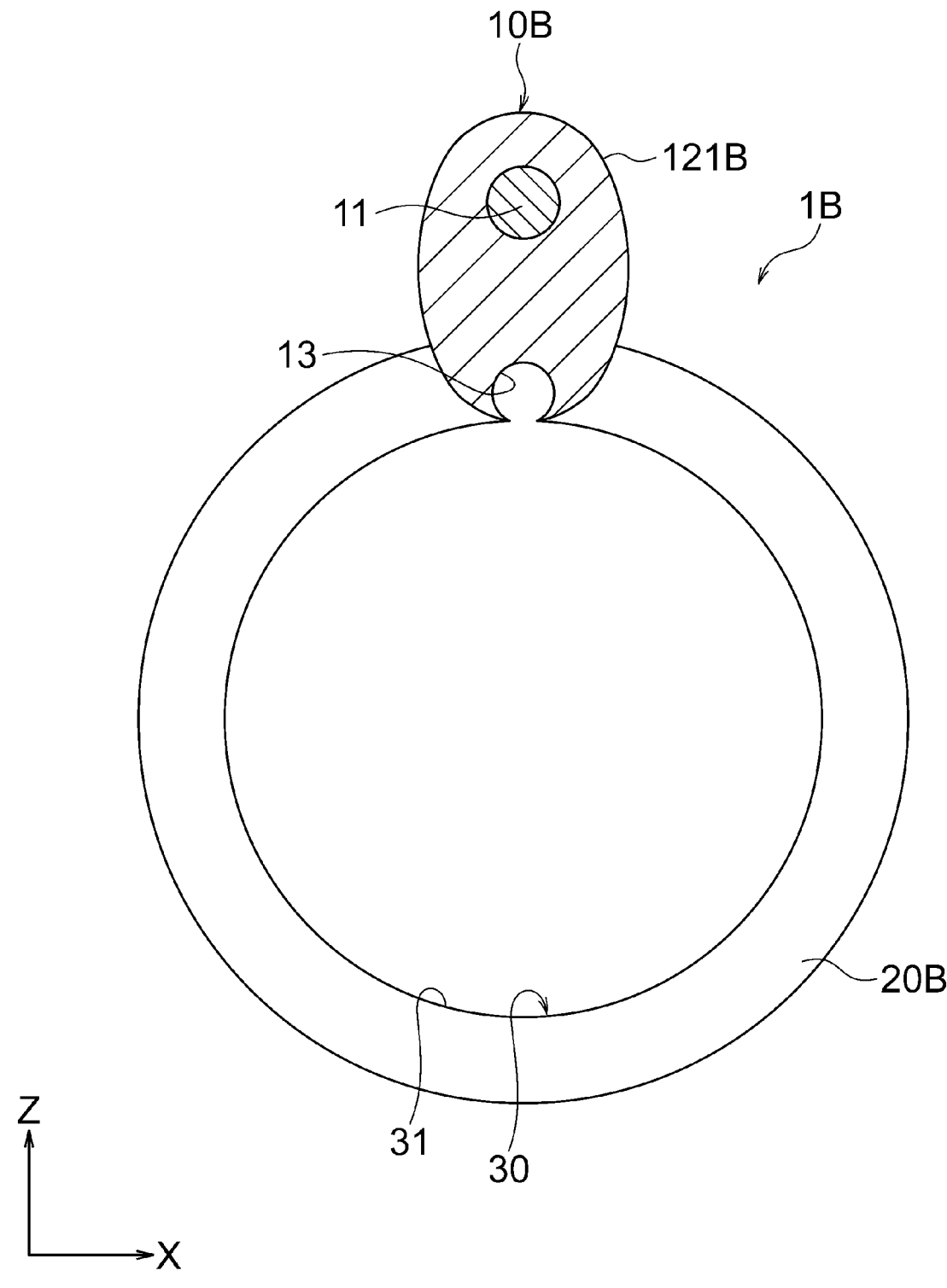
FIG. 6 is a cross-sectional view taken along the line VI-VI of FIG. 5.

FIG. 5 is a perspective view of an example of a conduit according to a second example. FIG. 6 is a cross-sectional view taken along the line VI-VI of FIG. 5.

In the second example, the point (1): the groove is formed in that the tubular portion of the coat, and the point (2): the hangers are directly connected to the tubular portion are different from the first example, but the other configurations are the same as the first example. Hereinafter, the tubular portion 121B and the hangers 20B of the second example will be described by focusing on a difference from the first example. The same reference numerals will be given to same components as those of the first example and a description thereof will be omitted.

As shown in FIGS. 5 and 6, in the conduit 1B, the tubular portion 121B of the coat 12B of the suspension wire 10B has an elliptical cylindrical shape. Inside this tubular portion 121B, the supporting wire 11 is disposed so as to be eccentric in the +Z direction. Further, in the lower end of the tubular portion 121B, the groove 13 extends over the entire axial direction of the suspension wire 10B is disposed. The coat 12B can be produced by coating a resinous material to the supporting wire 11 with extrusion molding or the like. The cross-sectional shape of the coat 12B is not particularly limited to the above.

In this tubular portion 121B, the hangers 20B are disposed at predetermined intervals along the axial direction of the suspension wire 10. The hanger 20B has a partially missing annulus, the missing portion is smaller than the missing portion of the first example. Then, the missing parts are joined to the tubular portion 121B to form the through-hole 30. The hangers 20B of the second example are produced by extrusion or the like apart from the suspension wire 10B. Then, in the field where the cable 100 is laid, the produced hangers are bonded to the suspension wire 10B by ultrasonic bonding or the like. The suspension wire 10B and the hangers 20B are produced separately, so that the conduit 1B can be transported in the state where the suspension wire 10B and the hangers 20B are separated, the conduit 1B can be easily transported. The hangers 20B may be joined to the suspension wire 10B at the plant where the suspension wire 10B and the hangers 20B are manufactured. Alternatively, the suspension wire 10B and the hangers 20B may be formed integrally by the extrusion molding method described in the first example.

Also when the cable is laid by using the conduit 1B in the second example, it is possible to use the same procedure as in the first example. Therefore, as in the first example, the cable can be easily laid.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in the above embodiments, the plurality of hanger 20,20B are arranged at equal intervals, but not limited thereto. The intervals between the respective hangers 20, 20B may be different from each other.

Further, the groove 13 may not be formed over the entire axial area of the suspension wire 10. For example, in the first example, the groove 13 may be not directly formed in the groove-formed portion 123, cylindrical portions in which the groove 13 is formed may be disposed in the lower surface of the groove-formed portion 123 of the coat 12 so that the cylindrical portions protrude downward, and these cylindrical portions may be intermittently arranged in the axial direction of the suspension wire 10. Alternatively, the cylindrical portions may be made of a separate member independent of the coat 12, the cylindrical portions may be joined to the coat 12.

Alternatively, in the second example, the protruding portions protruding downward may be disposed in the tubular portion 131B of the coat 12B, the groove 13 may be formed in each of the protruding portions, and these protruding portions may be intermittently arranged in the axial direction of the suspension wire 10. Alternatively, the protruding portions may be made of a separate member independent of the coat 12, the protruding portions may be joined to the coat 12.

Alternatively, the groove 13 may be formed at a position where a worker can insert or remove the wire-carrying rod 201 from the vicinity of the first or second end 123*c*, 123*d*. For example, the groove 13 is not formed on the first and second ends 123*c*, 123*d*, and may be formed over the entire central portion except for the first and second ends 123*c*, 123*d*.

In the coat 12 of the first example, the neck portion 122 may be omitted, and the groove-formed portion 123 may be directly connected to the tubular portion 121.

Further, in the second example, instead of the hangers 20B, the spiral hanger having a helical shape having the ends may be suspended on the suspension wire 10B. In this case, the cable 100 is accommodated in the spiral hanger.

Further, in the above method for laying the cable, after the first step of connecting the cable 100 to the third end 200*a* of the wire-carrying cord 202 side of the wire-carrying member 200, the second step of inserting the fourth end 200*b* of the wire-carrying rod 201 side of the wire-carrying member 200 to the groove 13, but is not limited thereto. For example, after inserting the wire-carrying rod 201 to the groove 13 (second step), the wire-carrying cord 202 may be connected to the wire-carrying rod 201 (first step). Alternatively, while inserting the wire-carrying rod 201 to the groove 13 (second step), the wire-carrying cord 202 may be connected to the wire-carrying rod 201 (first step). That is, the second step may be performed before the first step, or the first step and the second step may be performed simultaneously.

In addition, in the above method for laying the cable, the wire-carrying member 200 is composed of mutually independent members but is not limited thereto. For example, the wire-carrying member may be a single linear member with the thick-linear portion and the thin-linear portion integrally formed with the thick-linear portion.

EXPLANATIONS OF LETTERS OR NUMERALS

1 . . . CONDUIT
10,10B . . . SUSPENSION WIRE
11 . . . SUPPORTING WIRE
12,12B . . . COAT
121,121B . . . TUBULAR PORTION
122 . . . NECK PORTION
123 . . . GROOVE-FORMED PORTION
123A . . . UPPER SURFACE
123 B . . . LOWER SURFACE
13 . . . GROOVE
131 . . . OPENING
132 . . . INTERIOR
20,20B . . . HANGERS
30 . . . THROUGH HOLE
31 . . . INNER CIRCUMFERENCE
100 . . . CABLE
200 . . . WIRE-CARRYING MEMBER
200A . . . THIRD END
200B . . . FOURTH END
201 . . . WIRE-CARRYING ROD
202 . . . WIRE-CARRYING CORD

The invention claimed is:

1. A conduit for laying a cable, comprising:
a suspension wire;
one or more hangers held by the suspension wire and having an accommodation space that accommodates the cable; and
a groove extending along an axial direction of the suspension wire, wherein
the groove has an opening connected to the accommodation space,
the opening has a width smaller than a maximum width of an interior of the groove,
the suspension wire comprises:
a supporting wire; and
a coat coating the supporting wire, and
the groove is disposed in the coat such that the opening opens into the accommodation space.

2. The conduit according to claim 1, wherein two or more of the hangers are spaced along the axial direction, and each of the hangers has an annular shape, through which the cable is inserted, that is connected to the coat.

3. The conduit according to claim 1, wherein the one or more hangers are integrated with the coat.

4. The conduit according to claim 1, wherein the groove extends continuously over an entire axial area of the suspension wire.

5. The conduit according to claim 1, further comprising: one or more additional grooves.

6. A method for laying a cable using a conduit comprising a suspension wire, one or more hangers held by the suspension wire and having an accommodation space that accommodates the cable, and a groove extending along an axial direction of the suspension wire, wherein the groove has an opening connected to the accommodation space and the opening has a width smaller than a maximum width of an interior of the groove, the method comprising:
connecting the cable to a first end on a thin-wire portion side in a wire-carrying member having a thin-wire portion and a thick-wire portion thicker than the thin-wire portion;
inserting the wire-carrying member into the groove from a second end on a thick-wire portion side in the wire-carrying member; and
inserting the cable into the accommodation space by pulling the cable through the wire-carrying member while holding the thick-wire portion in the groove and positioning the thin-wire portion in the accommodation space, wherein
the thin-wire portion is thinner than the width of the opening, and
the thick-wire portion is thicker than the width of the opening and thinner than the maximum width of the interior of the groove.

7. The method according to claim 6, wherein the width of the opening is smaller than a width of the cable.

8. The method the cable according to claim 6, wherein the thin-wire portion and the thick-wire portion are composed of mutually independent members.

9. The conduit according to claim 1, wherein the width of the opening is 80% or less of the maximum width of the interior of the groove.

10. The conduit according to claim 1, wherein
the groove is in a lower portion of the coat below the supporting wire,
the one or more hangers are connected to the lower portion of the coat, and
the opening opens downward in the conduit.

* * * * *